United States Patent
Lindholm

[11] Patent Number: 5,890,005
[45] Date of Patent: Mar. 30, 1999

[54] LOW POWER, LOW INTERCONNECT COMPLEXITY MICROPROCESSOR AND MEMORY INTERFACE

[75] Inventor: Rune Lindholm, Salo, Finland

[73] Assignee: Nokia Mobile Phones Limited, Espoo, Finland

[21] Appl. No.: 867,295

[22] Filed: Jun. 2, 1997

[51] Int. Cl.$^6$ ................................................ H03K 19/003

[52] U.S. Cl. ........................ 395/750.03; 377/41; 711/102

[58] Field of Search ............................... 395/307, 750.03; 365/189.02, 189.05; 377/41; 711/102

[56] References Cited

U.S. PATENT DOCUMENTS

| | | | |
|---|---|---|---|
| 4,667,337 | 5/1987 | Fletcher | 377/41 |
| 5,353,328 | 10/1994 | Jokimies | 379/58 |
| 5,392,282 | 2/1995 | Kiema | 370/77 |
| 5,481,555 | 1/1996 | Wade et al. | 371/57.2 |
| 5,490,235 | 2/1996 | Von Holten et al. | 395/2.79 |
| 5,655,142 | 8/1997 | Gephardt et al. | 395/800.32 |
| 5,761,700 | 6/1998 | Cozart et al. | 711/102 |

FOREIGN PATENT DOCUMENTS 0 208 325 A2  1/1987  European Pat. Off. .

OTHER PUBLICATIONS

MOS Memory Data Book 1984, Commercial and Military Specifications, Texas Instruments, pp. 9–1—9–61 "TMS4500A Dram Controller Configured For The TMS99000 Series 16–Bit Microprocessors— and pp. 9–63—9–68 TMS4500A/8088 Interface".

Primary Examiner—Ly V. Hua
Attorney, Agent, or Firm—Perman & Green, LLP

[57] ABSTRACT

A method is disclosed for reducing the power consumption of an electronic system, such as a wireless or cellular telephone, that has a memory and a device for accessing the memory. The method includes the steps of (a)during a first part of a memory access cycle, applying an address over a bus; (b) during a second part of the memory access cycle, transferring data to or from the memory over at least a portion of the bus; and (c) prior to the step of transferring, selectively inverting or not inverting the data so as to minimize a number of bus signal lines that are required to change state between the first part and the second part of the memory access cycle. In a preferred embodiment of the invention the bus is a multiplexed address/data bus. The method also generates a control signal that is transmitted to the bus for informing a receiving device that the data (or address) being transferred over the multiplexed address/data bus should be inverted before use. Also disclosed is a memory that operates in a burst mode by incrementing or decrementing memory addresses using a clock signal, and that operates with the power saving circuitry to selectively invert or not invert burst mode data read from or written to the memory.

29 Claims, 10 Drawing Sheets

LOW POWER, LOW INTERCONNECT COMPLEXITY MICROPROCESSOR AND MEMORY INTERFACE

FIELD OF THE INVENTION

This invention relates generally to digital data processors and, in particular, to processor/memory interface circuits and methods.

BACKGROUND OF THE INVENTION

One conventional microprocessor memory interface includes an address bus, a data bus, and a control bus comprised of a plurality of control signals (e.g., read/write). The number of address signal lines required depends upon the size of the memory (i.e., the number of addressable memory locations). The number of data signal lines required depends upon the type of microprocessor used. Conventional data bus widths are typically n(8) bits, where n is an integer equal to or greater than one. The control bus has a number of lines required for at least selecting, reading, or writing the external memory.

By example, for an 8 Mbit memory that is organized as 1024 kbits×8 bits, 20 address lines and eight data lines are required. A memory access is performed by first applying the address of a memory location, and then asserting one or more control lines to perform the desired memory read or write access. For a memory write operation it is necessary to also drive the date bus with the data to be written. If the 8 Mbit memory is instead organized as 524 k×16 bits, then 19 address lines and 16 data lines are required in order to access the entire memory.

It is also known in the microprocessor field to employ a multiplexed address/data bus, wherein at least some of the address signal lines also function as data lines. For example, during a first part of a memory access cycle the multiplexed lines convey address information to the memory, while in a later part of the cycle these same lines convey data that is written to or that is read from the memory. For this type of architecture it is known to provide an address valid or similar control signal line for indicating to external circuitry when the multiplexed address/data lines are conveying address information as opposed to data. This control signal line is typically used to latch the address information into an external latching device so that the address information remains stable after the multiplexed address/data bus switches from the address to the data mode of operation.

The power consumption of a digital integrated circuit is a function of a number of parameters, including the number of external output signal lines that are driven and the number of state changes at each output. These factors become increasingly important when one integrates a microprocessor and external memory into a battery operated device, such as a handheld wireless telephone, a cellular telephone, or a personal communicator. In such a device it is desirable to reduce the overall power consumption as much as possible in order to increase the time between required rechargings of the battery.

OBJECTS AND ADVANTAGES OF THE INVENTION

It is a first object and advantage of this invention to provide a technique to reduce a power consumption of a battery powered device by reducing one or both of the number of driven output signal lines or the number of state changes at each output.

It is a further object and advantage of this invention to provide a novel bus and interface for devices coupled to the bus, wherein the bus is operated to reduce the overall power consumption of a system that contains the bus and devices by minimizing a number of signal state changes on the bus.

SUMMARY OF THE INVENTION

The foregoing and other problems are overcome and the objects of the invention are realized by methods and apparatus in accordance with embodiments of this invention, wherein the power consumption of a battery powered device is reduced by reducing one or both of the number of driven output signal lines or the number of state changes at each output. This invention teaches in one aspect the construction and operation of a memory interface between a microprocessor and a memory that reduces the amount of power used to drive the memory interface bus, and that also reduces an amount of interconnects between the microprocessor and the memory. In other aspects of this invention the interface may be used between any two devices that exchange information over a bus, such as a microprocessor device and a peripheral device, such as a DMA controller or a serial or parallel interface device.

A method is disclosed for reducing the power consumption of an electronic system, such as a wireless or cellular telephone, that has a memory and a device for accessing the memory. The method includes the steps of (a) during a first part of a memory access cycle, applying an address over a bus; (b) during a second part of the memory access cycle, transferring data to or from the memory over at least a portion of the bus; and (c) prior to the step of transferring, selectively inverting or not inverting the data so as to minimize a number of bus signal lines that are required to change state between the first part and the second part of the memory access cycle. In a preferred embodiment of the invention the bus is a multiplexed address/data bus. The method also generates a control signal that is transmitted to the bus for informing a receiving device that the data (or address) being transferred over the multiplexed address/data bus should be inverted before use. Also disclosed is a memory that operates in a burst mode by incrementing or decrementing memory addresses using a clock signal, and that operates with the power saving circuitry to selectively invert or not invert burst mode data read from or written to the memory.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1A:
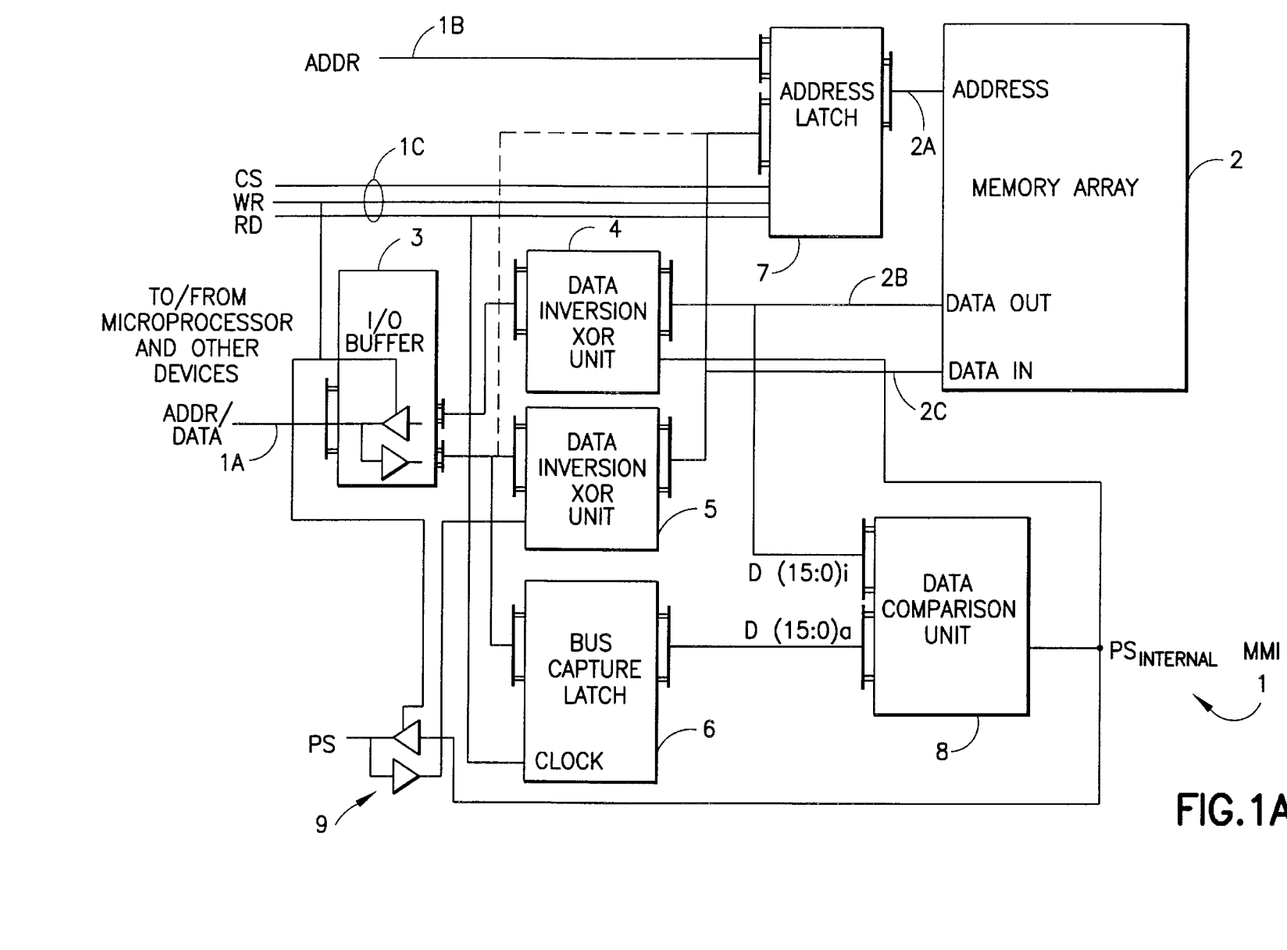
FIG. 1A is a block diagram of memory interface circuitry shown coupled to a memory array in accordance with a first embodiment of this invention.

FIG. 1A is a block diagram of a first embodiment of a microprocessor/memory interface (MMI) 1. The MMI 1 is coupled to a memory array 2 through an address port 2A, a data out port 2B, and a data in port 2C. A multiplexed address/data bus (e.g., 16-bits in width) is input/output on an ADDR/DATA bus 1A. Additional address information is provided by a separate, non-multiplexed ADDR bus 1B. The width of the additional ADDR bus 1B depends upon the size of the memory array 2. In some embodiments, wherein the memory array 2 has a size that can be completely addressed by the ADDR/DATA bus 1A, the ADDR bus 1B can be eliminated. Also provided is a Control bus 1C having a chip select (CS) signal line, a write (WR) signal line, and a read (RD) signal line. More or less signal lines can be included. By example, in some embodiments a single RD/WR signal line can be provided. It is understood that the ADDR/DATA bus 1A, the ADDR bus 1B, and the CONTROL bus 1C are all coupled to a suitable data processor, typically a microprocessor (not shown in FIG. 1), and may also be coupled to other devices, such as DMA controller (not shown).

The MMI 1 is further comprised of an input/output (I/O) buffer 3 that is coupled to the ADDR/DATA bus 1A and to the RD control line, an output (relative to the memory array 2) data inversion exclusive-OR (XOR) unit 4 that is coupled to the input of the I/O buffer 3, an input data inversion XOR unit 5 that is coupled to an output of the I/O buffer 3, a data bus capture latch 6 that is coupled to the output of the I/O buffer 3, an address latch 7 which is coupled to the ADDR information output from the I/O buffer 3 (in one embodiment) or to the output of the input data inversion XOR unit 5 (in another embodiment), and a two port data comparison unit 8 having a first input port coupled to the data output 2B of the memory array 2, a second input port coupled to an output of the data capture latch 6, and an output power control signal (referred to as $PS_{internal}$) coupled to a control input of the output data inversion XOR unit 4 and to an input of a PS transceiver 9. An output of the PS transceiver 9 is coupled to a control input of the input data inversion XOR unit 5. The operation of the MMI 1 in conjunction with the memory array 2 will be described in detail below.

It is first noted that the MMI 1 of FIG. 1A does not provide a separate control signal for latching the ADDR bus 1B. In the illustrated embodiment the address latch signal is generated with combinatorial logic (not shown) from the CS, WR and RD signals. Furthermore, the illustrated embodiment shows an implementation where the multiplexed address on the common ADDR/DATA bus 1A is included in the power saving function. The dotted connection FIG. 1A from the output of the I/O buffer 3 to the address latch 7 is used if the memory address is not included in the power save function.

The low interconnect microprocessor/memory interface bus uses the multiplexed address/data bus 1A, that is used for addressing memory locations, to also convey the data that is read from or written to the memory array 2. This approach implies that the address information be stored in or adjacent to the memory array 2. For this purpose a control signal, referred to as "address latch enable", hereinafter referred to as "LE", is used. The LE signal causes a storage of the state of the common ADDR/DATA bus 1A as address information at its falling edge. When the LE signal is active, i.e., in the high state, the information presented on the common ADDR/DATA bus 1A is interpreted as address information. When the LE signal is in the low state the information is interpreted as data, and by using the other control signals the memory array 2 either outputs data to be read by the microprocessor or writes the data into a memory location that was previously addressed when the LE signal was high.

As was mentioned above, the LE signal may be omitted if the timing of the Chip Enable (CE) signal and the Read and Write (RD and WR) signals are arranged in such a way that the address latch 7 is transparent. In this case the information on the common ADDR/DATA bus 1A is interpreted as address information so long as CE is active (e.g., low) and the RD and WR are inactive (e.g., high). When this condition exists it is indicated that a memory access cycle is in progress, and that address information is presented on the common ADDR/DATA bus 1A. When either the RD or WR signals transition to the active state, it is indicated that data is to be read from the memory array 2 to the common ADDR/DATA bus 1A, or is to be input to the memory array 2 from the common ADDR/DATA bus 1A, respectively. When either of the RD or WR signals goes active, the information on the common ADDR/DATA bus 1A is latched into the address latch 7 as address information.

The illustrated MMI 1, which uses the multiplexed address/data bus 1A, thus reduces the data bus interconnects that are required with a conventional microprocessor bus. As the address and data share the same bus the speed of the data that can be read using the low interconnect MMI 1 is reduced by about one half as compared to a conventional non-multiplexed bus. To compensate for this reduction in access time the data that normally would be read in 8-bit format is instead read in a 16-bit (or 32-bit, or 64-bit) format. As the number of required address lines typically exceeds 16, the embodiment of FIG. 1A does not incur any additional overhead from the interconnect point of view.

Furthermore, the data rate can be increased by using a burst mode access, where the first address of a block of data is applied and latched, and the address is subsequently incremented by applying an externally generated or internally generated clock (CLK) signal after each data read/write operation. This type of operation, which assumes access to sequential memory locations, thus eliminates the need to apply a new address after each data operation. Different types of burst mode operation can be used, but they all share in common the idea that only the first address of the memory locations to be accessed is presented to the memory array 2. The length of the burst may vary (i.e., the number of consecutive read or write accesses).

Figure 1B:
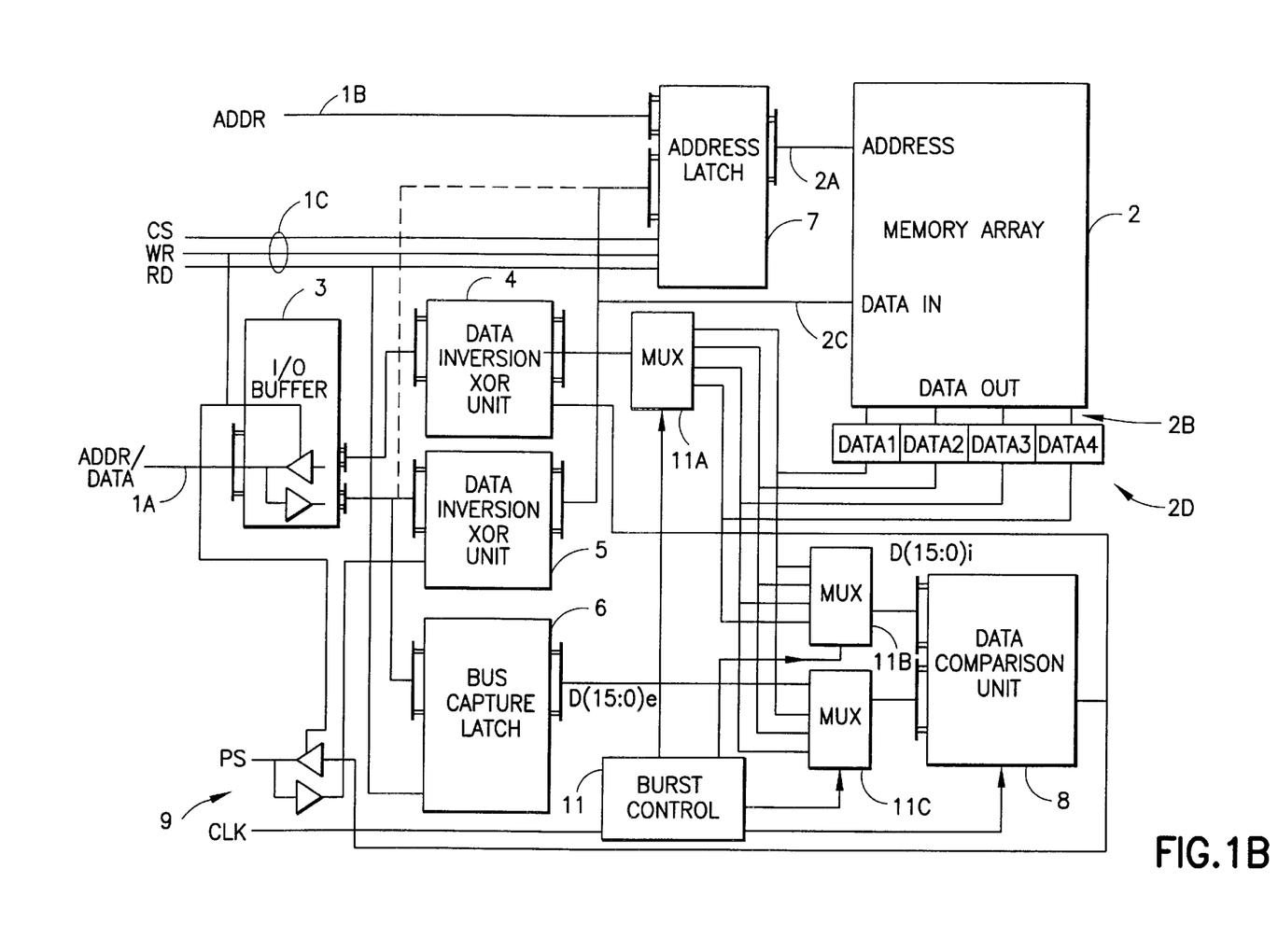
FIG. 1B is a block diagram of memory interface circuitry shown coupled to a memory array in accordance with a second, burst mode pipelined embodiment of this invention.

By example, FIG. 1B depicts a pipelined burst mode embodiment having a burst control logic block 11 coupled to the CLK input. The burst control logic block 11 provides control outputs to three multiplexers (MUX) 11A, 11B and 11C. Also, the data out port 2B of the memory array 2 is arranged to provide multiple output bytes or words(e.g., four 16-bit output words in parallel) to a corresponding number of data pipeline latches 2D. The burst control logic block 11 sequentially outputs the data words stored in the data pipeline latches 2D (DATA1–DATA4) at a rate established by the transitioning of the CLK signal, and thus provides a high speed memory access.

As was indicated previously, power is consumed in a digital system when a signal changes state. More particularly, power is consumed when a capacitive load associated with signal line traces, device terminals and connector terminals is either charged or discharged. Typically, the internal capacitive load of a digital integrated circuit is lower than the capacitive load observed at the interconnect level of the printed circuit board.

The inventor has realized that a power saving advantage can be gained if the amount of signal transitions on the external interconnections, e.g., between two digital circuits, can be minimized. Therefore, on a wide bus such as an address/data bus in a microprocessor system, overall power consumption is reduced when the data to be transmitted on the external bus causes a minimum number of signal transitions on the external interconnects (e.g., signal line traces and device I/O pins).

In accordance with an aspect of this invention a reduction in power consumption is achieved by comparing the information (e.g., data or address) previously appearing on a bus with the information to be transmitted over the bus, by determining if an inversion of the data to be transmitted will cause fewer signal transitions to occur than if the information were transmitted without being inverted, and, if so, by inverting the data before transmission. In order to indicate that the information has been inverted a control signal is generated and transmitted over the bus to inform the receiving device that the information must be inverted once again before any further processing occurs. In the embodiment of FIGS. 1A and 1B the PS signal performs this function, and the data comparison unit 8, in combination with the bus capture latch 6, makes the determination if an inversion of the data is required.

More particularly, and referring again to FIG. 1A, data appearing on the common ADDR/DATA bus 1A is bit-wise compared with the data previously appearing on the common ADDR/DATA bus 1A. For example, the current state of the data bus LSB ($D0_{current}$) is compared with the new data to be output on D0 ($D0_{next}$) If the two data bits are equal ($D0_{current}=D0_{next}$) a logic 0 is indicated by the bit comparison logic, and if the two data bits are not equal ($D0_{current}=NOT(D0_{next})$), then the bit comparison logic indicates a logic one (an XOR function). The results of the comparisons of all of the bits (e.g., D0–D15 for a 16-bit bus) are then examined and, if there are more (or the same number) of equal bits than unequal bits on the common ADDR/DATA bus 1A, the next data is not inverted before it is output on the common ADDR/DATA bus 1A, and the PS signal assumes a first state. That is, $PS_{internal}$ and PS=0. If there are more unequal than equal data bits on the common ADDR/DATA bus 1A, the next data is inverted before it is output, and the PS signal assumes a second state. That is, $PS_{internal}$ and PS=1. The PS signal is a common signal for all of the devices connected to the common ADDR/DATA bus 1A. The device that is to receive the data examines the state of the PS signal and inverts the received data if necessary. In that only one device at a time can drive data to the common ADDR/DATA bus 1A, only the one bidirectional PS signal line is required. This embodiment thus assumes the use of conventional high impedance or open collector bus drivers for the ADDR/DATA bus and the PS signal line.

In the pipelined burst mode embodiment of FIG. 1B the PS signal can be generated in accordance with two different approaches. As the generation of the PS signal adds some incremental delay to the read response from the memory array 2, in accordance with the first approach the response time is reduced for the first word that is to be output from the memory array 1A (e.g., the word read into the DATA1 latch 2D). This is accomplished by not comparing the first word with the latched bus state in bus capture latch 6, but instead by outputting the first word directly to the ADDR/DATA bus 1A through the multiplexer 11A, XOR unit 4 and I/O buffer 3. In this case the PS signal is set to indicate that no inversion was applied to the output word. When outputting the word in the DATA1 latch, the word stored in the DATA2 latch is compared with the DATA1 word (which is still stored in the DATA1 latch) using multiplexers 11B and 11C and the data comparison unit 8. The PS signal is set accordingly, and the word stored in the DATA2 latch is then driven to the ADDR/DATA bus 1A, when the CLK signal is applied, in inverted or non-inverted form as determined by the data comparison unit 8. When outputting the word in the DATA2 latch, the word stored in the DATA3 latch is compared with the latched DATA2 word, using multiplexers 11B and 11C and the data comparison unit 8, and the PS signal is set accordingly. The same is true for the word stored in the DATA4 latch, which is compared with the DATA3 word. In this embodiment the comparison is made with the data as output from the memory array 2, and not the actual inverted or non-inverted data that is driven to ADDR/DATA bus 1A. However, since the comparison logic 8 has knowledge of the state of the PS signal for each output word, the state of the data at the ADDR/DATA bus is also known.

In the second approach mentioned above, and for a case where the PS generation time delay for the first output word is not objectionable, the word stored in the DATA1 latch is compared with the previous state of the address bus stored in the bus capture latch 6, and the PS signal is set accordingly.

Figure 2:
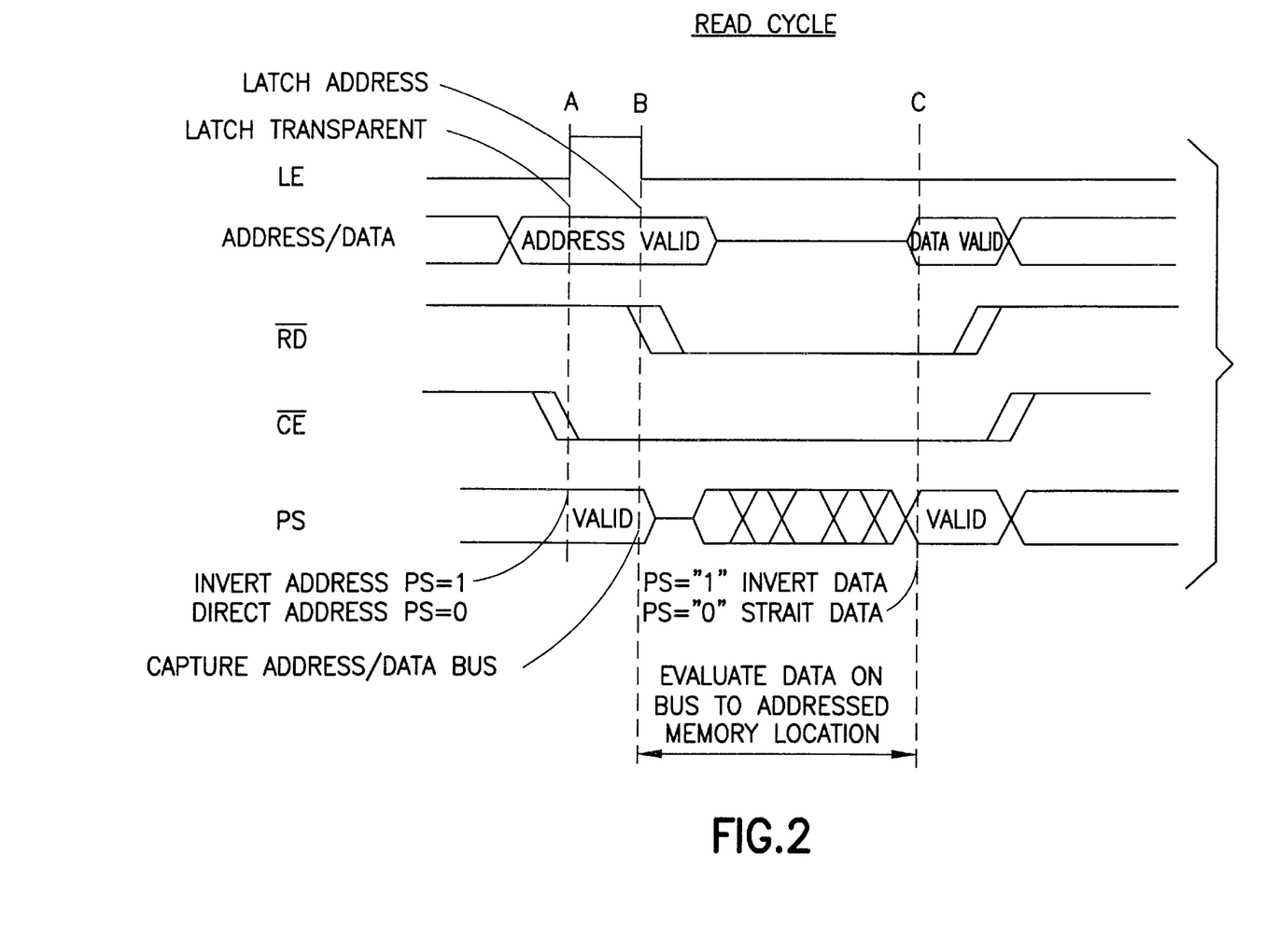
FIG. 2 illustrates exemplary memory read access timing in accordance with a first embodiment of this invention, wherein an address latch enable (LE) signal is provided on a bus to a receiving device.
Figure 3:
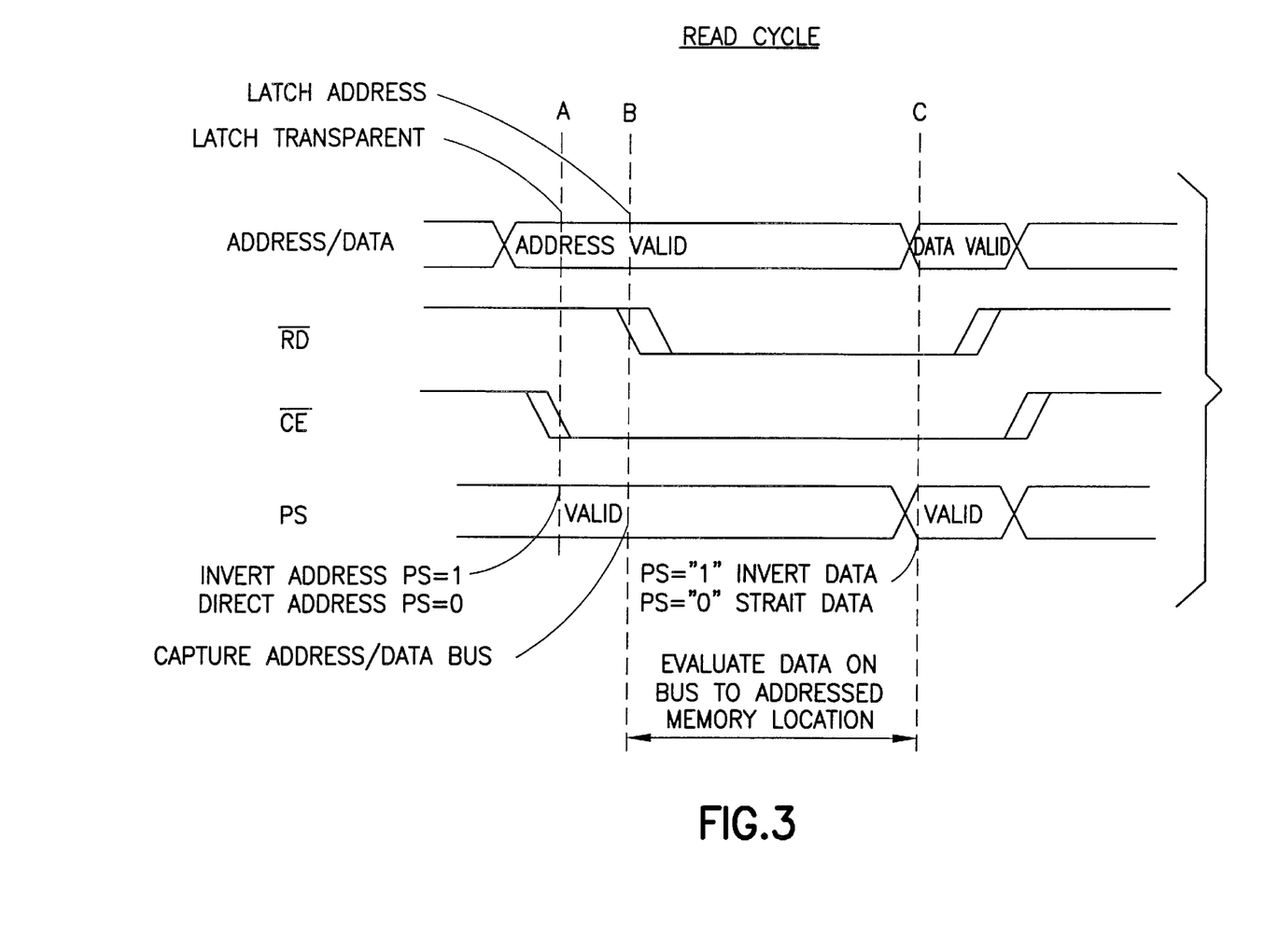
FIG. 3 illustrates exemplary memory read access timing in accordance with a second embodiment of this invention, wherein the latch enable signal is generated at the receiving end of the bus transaction.

FIG. 2 illustrates the read access timing for the low interconnect, low power ADDR/DATA bus 1A bus using the LE signal. The same timing diagram, for the case where the LE signal is generated internally from the CE and RD/WR signals, is shown in FIG. 3. In FIG. 2 the Address/Data bus 1A is shown going to a high impedance state between the Address Valid and Data Valid states. As is indicated in FIG. 3, however, in some embodiments the Address/Data bus 1A may not enter a high impedance state between the transition between the Address Valid and Data Valid states.

The memory location to be read is addressed by the microprocessor and the address latch 7 is made transparent at point A in FIGS. 2 and 3. At point B the address is latched by the address latch 7. Between points A and B the state of the PS signal is tested to determine if the address to be latched is to be inverted or not before latching. This (optional) mode of operation allows the power saving function to also be used for address information transmitted over the common ADDR/DATA bus 1A. If the address is to be inverted this is accomplished automatically by the XOR unit 5 under the control of the input PS signal from the transceiver 9.

At point B the state of the common ADDR/DATA bus 1A is captured in the bus capture latch 6 for power control analysis. In this case the captured data is equal to the address information that was transmitted over the common ADDR/ DATA bus 1A. The captured data is then compared with the data appearing on the memory array data out bus 2B, the data being read out of the addressed memory location. The result of the comparison is output as the $PS_{internal}$ and PS signal at point C, i.e., after the data output from the memory array 1 has become stable. The state of the PS signal output from the PS transceiver 9 indicates to the reading device (e.g., the microprocessor) that the valid data that is output on the common ADDR/DATA bus 1A at point C is to be inverted or not inverted by the receiver before processing the data.

It can thus be seen that in this embodiment the state of the common ADDR/DATA bus 1A at the start of the memory access cycle is compared to the required state of the ADDR/ DATA bus 1A at the end of the cycle. That is, the input address information is compared to the output data information. If driving the data information to the ADDR/DATA bus 1A will cause more than a predetermined number of signal line transitions, then the output data is inverted by the XOR unit 4, under control of the $PS_{internal}$ signal, prior to inputting the data to the I/O buffer 3.

For example, assume that the address conveyed over the ADDR/DATA bus 1A is FFED (all examples assume a hexadecimal representation), and further assume that the output data from the addressed memory location is FFFF. In this case only two bits will transition on the ADDR/DATA bus 1A, the output data is not inverted, and the PS signal line will be a zero. If instead the data stored at this same location were 2480, significantly more than 50% of the ADDR/DATA bus signal lines will be required to change state. In this case the data is inverted (and is transmitted as DB7F), and the PS signal line will be a one. The receiving device, being responsive to the PS signal line, will then invert the data back to 2480 before using same.

Figure 4:
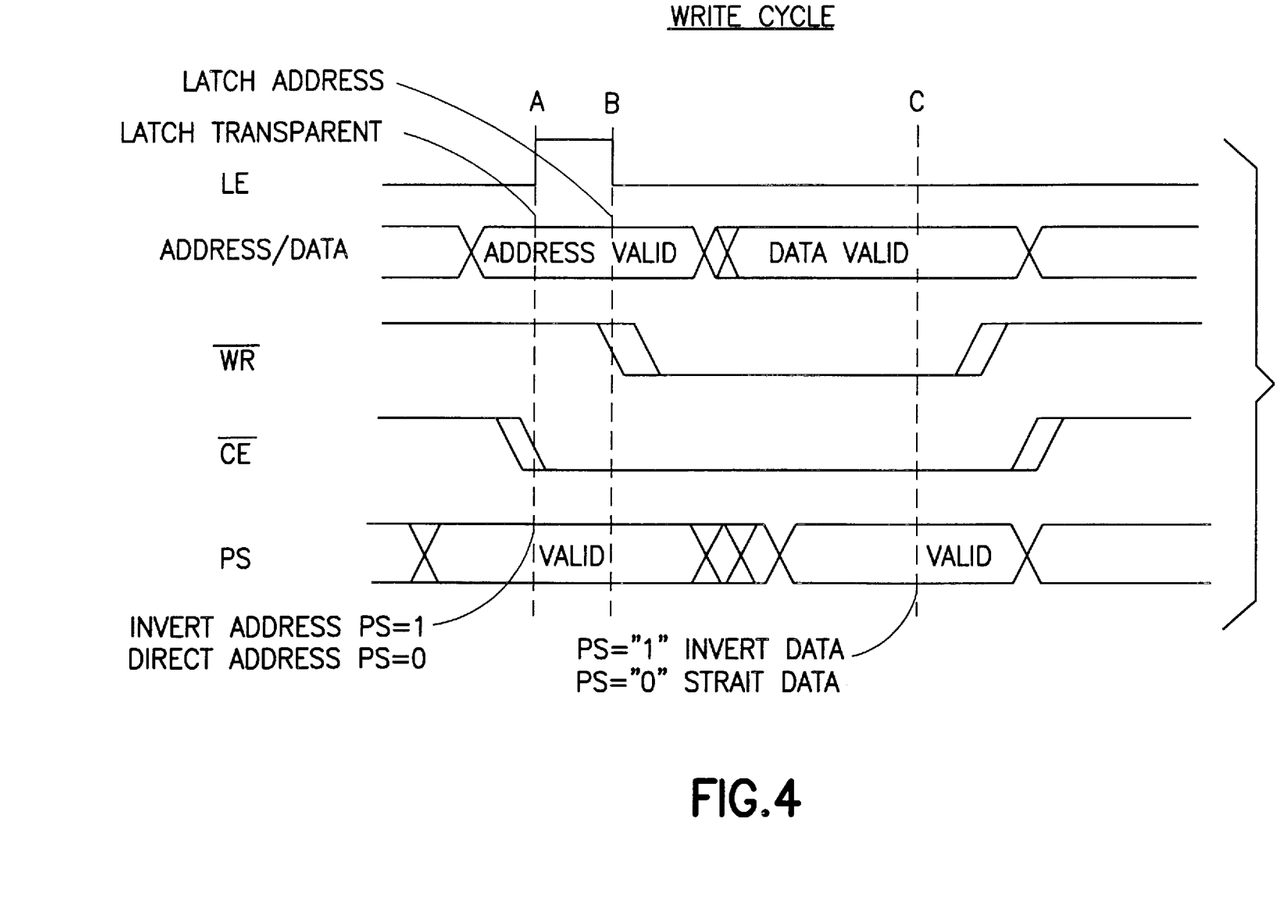
FIG. 4 illustrates exemplary memory write access timing in accordance with the first embodiment of this invention, wherein the address latch enable signal is provided on the bus.
Figure 5:
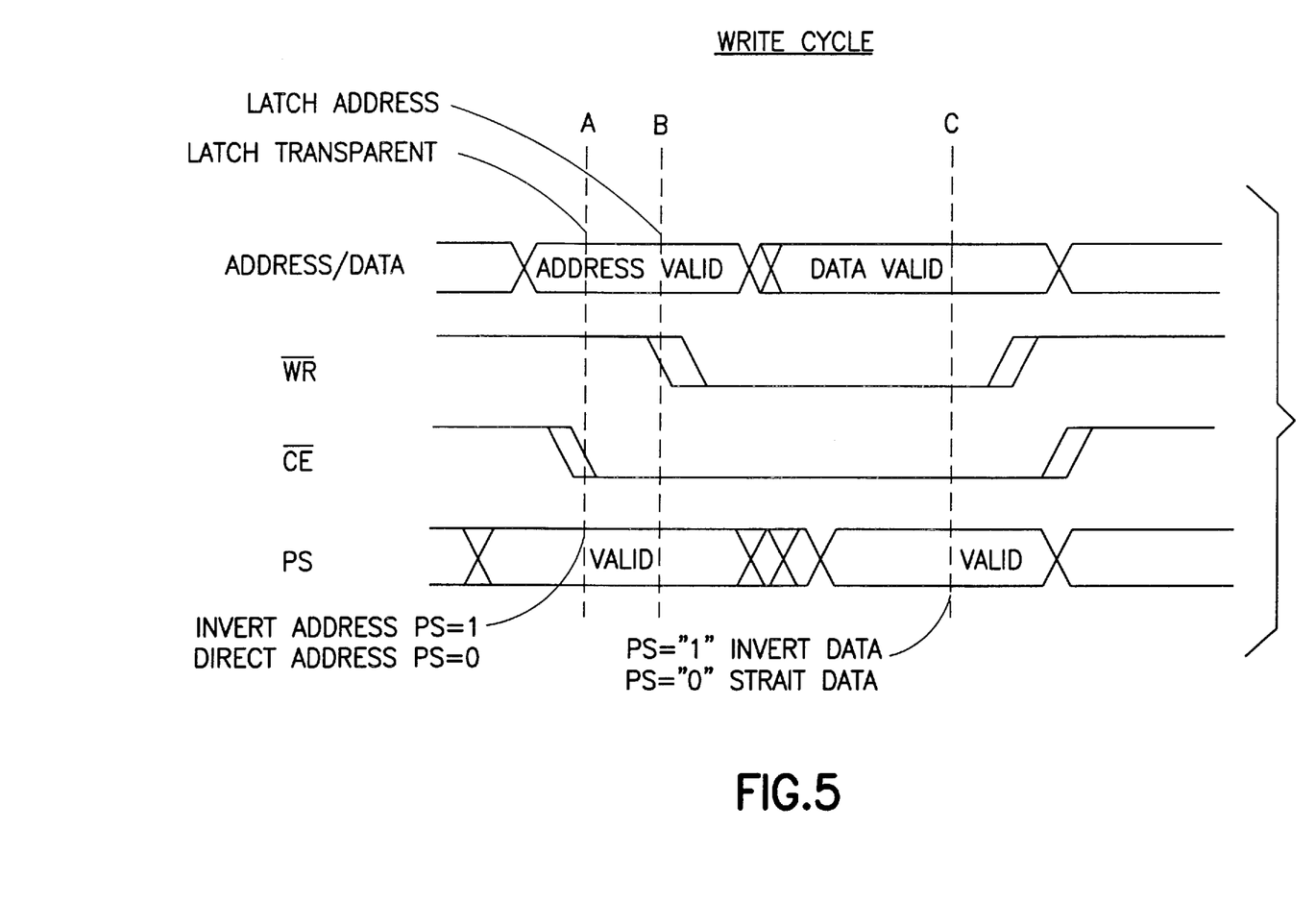
FIG. 5 illustrates exemplary memory write access timing in accordance with the second embodiment of this invention, wherein the address latch enable signal is generated at the receiving end of the bus transaction.

FIG. 4 shows the write access timing using the LE signal. The write access timing not using the LE signal is shown in FIG. 5. In this case the memory location to be written is addressed by the microprocessor and the address latch 7 is made transparent at point A in FIGS. 4 and 5. At point B the address is latched by the address latch 7. Between points A and B the state of the PS signal is tested to determine if the address to be latched is to be inverted or not before latching. As before, this (optional) mode of operation allows the power saving function to also be used for address information transmitted over the common ADDR/DATA bus 1A. If the address is to be inverted this is accomplished automatically by the XOR unit 5 under the control of the input PS signal from the transceiver 9.

As this is a write operation it is not necessary to capture the state of the ADDR/DATA bus 1A at point B. The PS signal generated by the writing device (e.g., a microprocessor, DMA controller, etc.), in conjunction with the XOR unit 5, is used to invert the data, if necessary, prior to application of the data to the memory array data input port 2C. The inversion is controlled by the state of the PS signal as received from the PS transceiver 9.

Further in accordance with an aspect of this invention the burst mode is primarily used for reading, although it can also be used for write operations. Using the burst mode reduces the overhead that the address causes on the ADDR/DATA bus 1A. This is particularly important on the low interconnect bus where the address and data information are multiplexed on the same physical bus. The overhead is reduced to 1/BL, where BL is the number of accesses performed during each burst.

Figure 6:
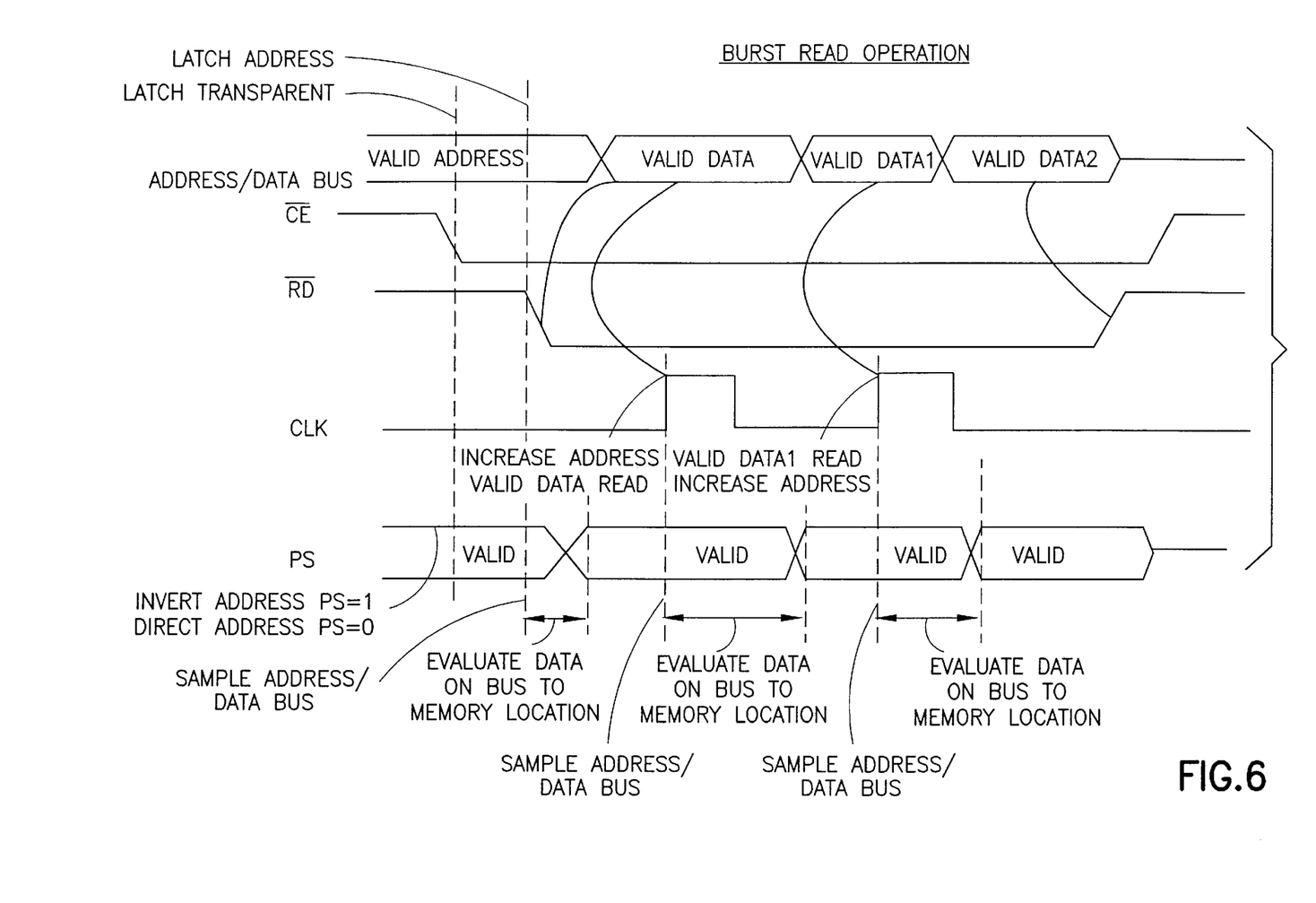
FIG. 6 illustrates exemplary memory burst read access timing in accordance with an aspect of this invention.
Figure 7:
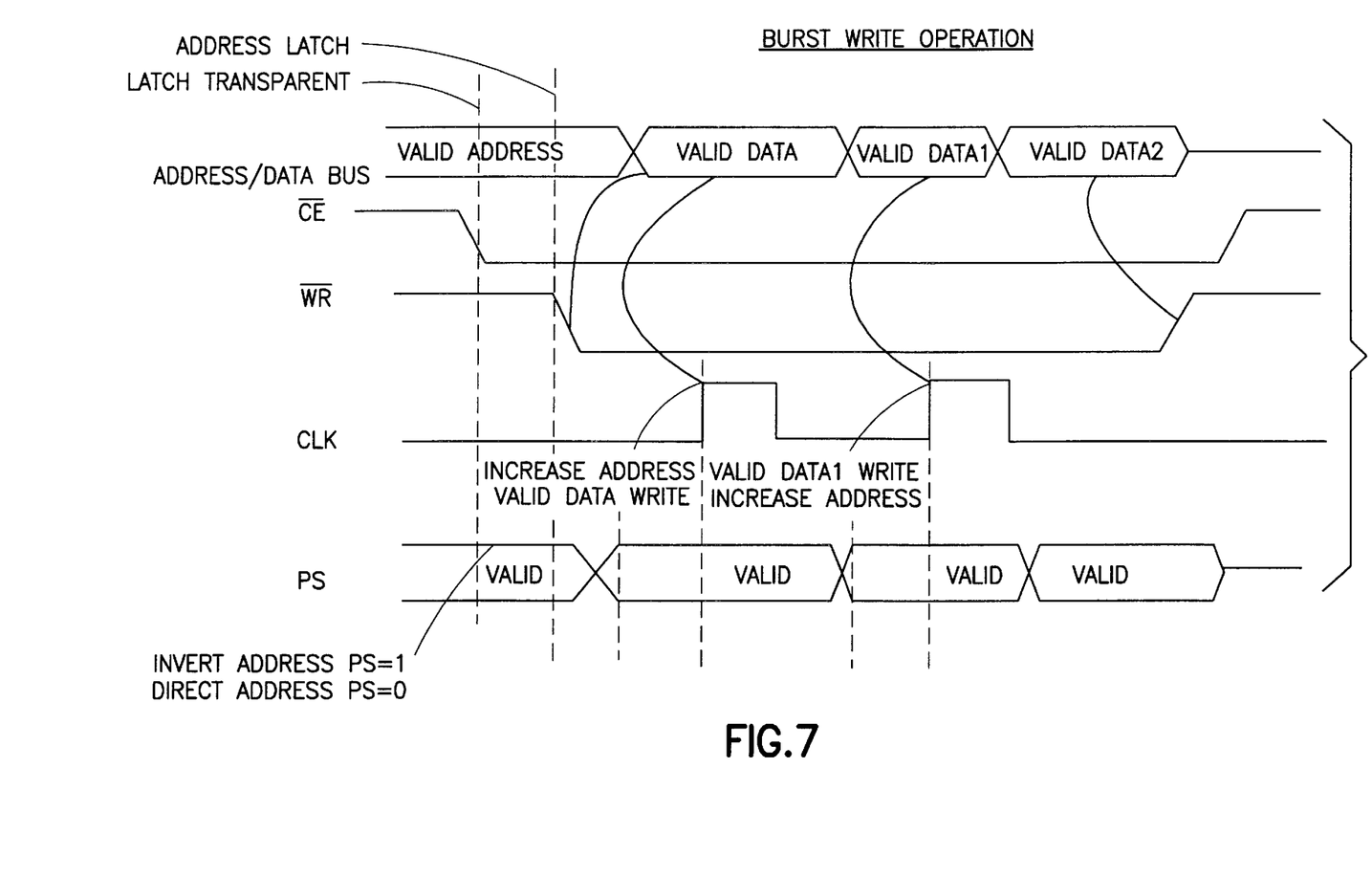
FIG. 7 illustrates exemplary memory burst write access timing in accordance with an aspect of this invention.

As is illustrated in FIGS. 6 and 7, the first address is applied in the burst mode to indicate the initial memory location of the burst access. In the burst access mode the address is then incremented by applying an external clock (CLK) signal that increments the address internally to the selected device. The clock used to increment the address in the burst mode access also enhances the power saving function by minimizing the number of transitions on the ADDR/DATA bus 1A.

In this embodiment the address latch 7 of FIGS. 1A and 1B can be replaced by a parallel loaded binary counter that stores the address information on the transition of LE (internally or externally generated), and that is then subsequently incremented by the CLK signal. If desired, a further bus signal can be used to indicate the direction (DIR) of counting (i.e., up or down), thereby enabling consecutive memory accesses to be made to higher or lower memory addresses.

Although the LE signal may be used to latch the first address in the burst access mode, in the timing diagrams of FIGS. 6 and 7 the LE signal has been omitted, and the address latch signal is generated internally as described above.

Referring to FIG. 6 for the burst read operation case, the first address in the burst mode access is applied and the internal address latch in the memory device is transparent between point A and point B. The data appearing on the ADDR/DATA bus 1A is interpreted as address information from point A to point B. At point B the address is latched. The state of the PS signal is evaluated between points A and B and the address is inverted or not inverted before it is latched according to the state of PS. The state of the ADDR/DATA bus may be captured at point B for power analysis, as described above for the read operation of FIGS. 2 and 3, if the first output word from the Data1 latch is to be compared with the state of the address bus. In this case the state of the ADDR/DATA bus 1A at point B is compared to the data read from the addressed memory location using the data comparison unit 8. The result of the comparison is indicated by the state of the $PS_{internal}$ signal, and the output data is inverted by the XOR unit 4 if required. The data is read by the microprocessor from the ADDR/DATA bus 1A at the rising edge of the CLK signal. The rising edge of the CLK signal is also used to increment or decrement the internal address held by the counter 7. The address increment/decrement is dependent upon the type of burst mode implemented. The result of the next comparison is indicated using the $PS_{internal}$ signal and is output to the reading device as the PS signal at the next rising edge of the CLK signal, or if it is the last access in the burst, at the rising edge of the RD signal.

The burst mode write timing is shown in FIG. 7. The starting address is latched by the address counter 7 and the address is subsequently incremented by the CLK signal. Writing using the burst mode includes an evaluation of the PS signal by the writing device, and no power save analysis required by the receiving device. The inputted data is inverted or not inverted, according to the PS signal, before writing it to the addressed memory location.

The address latching is performed as described above. At the rising edge of the CLK signal the data is written to the addressed memory location. The PS signal is evaluated before the write operation in order to convert the data accordingly. For a last write access of the burst the data is written by the rising edge of the WR signal.

Figure 8:
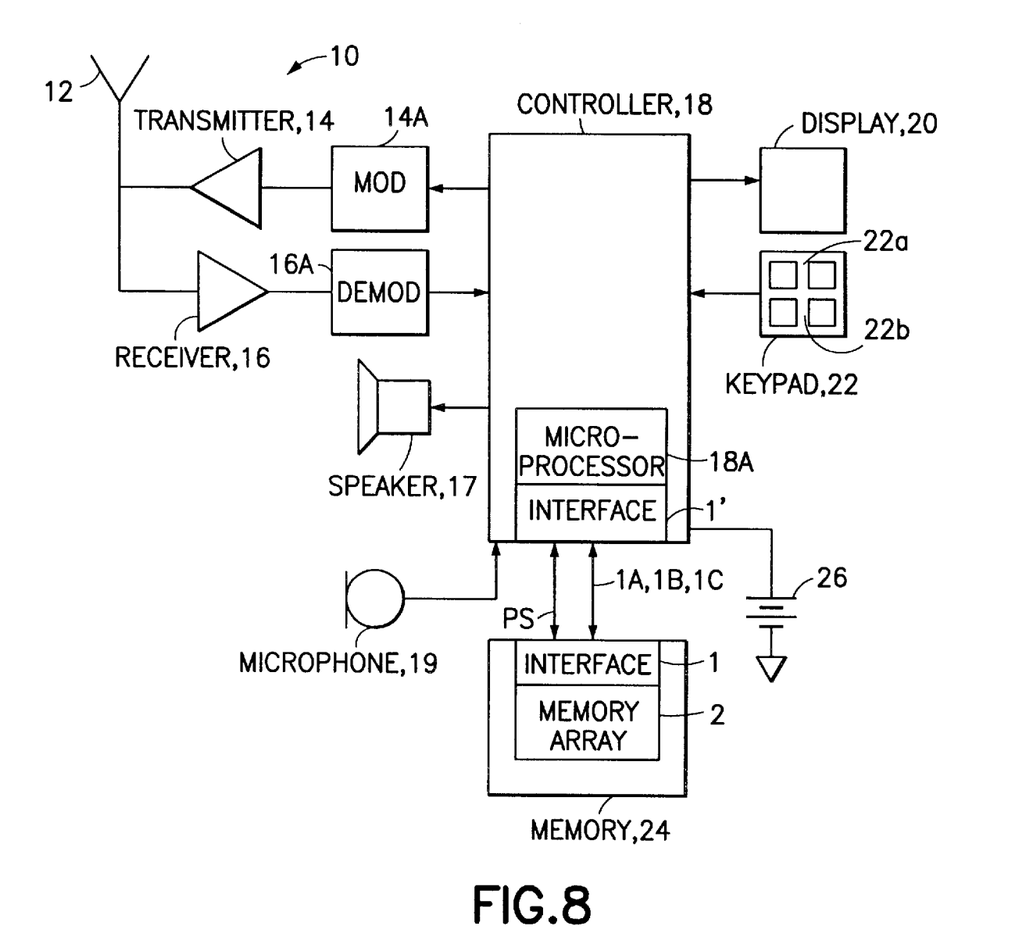
FIG. 8 is a simplified block diagram of an exemplary handheld communication device that includes the processor/memory interface in accordance with this invention.

Reference is made to FIG. 8 for illustrating a wireless user terminal or mobile station 10, such as but not limited to a cellular radiotelephone or a personal communicator, that is constructed to include the processor/memory interface 1 of this invention. The mobile station 10 includes an antenna 12 for transmitting signals to and for receiving signals from a base site or base station.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard may be any suitable standard for enabling bidirectional voice and/or data communications with the mobile station 10.

It is understood that the controller 18 also includes the circuitry required for implementing the audio and logic functions of the mobile station. By example, the controller 18 may be comprised of a digital signal processor device, a microprocessor device 18A, and various analog to digital converters, digital to analog converters, and other support circuits. The control and signal processing functions of the mobile station are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user. The memory 24 includes the read/write memory array 1, as described above with respect to FIGS. 1A and 1B.

In accordance with this invention the MMI 1 is included within memory array 1, and another interface 1' is included in the microprocessor device 18a that forms a part of the controller 18. More particularly, the MMI 1 is associated with the memory array 2, and the microprocessor 18A includes interface circuitry 1' for generating the PS signal, and for selectively inverting data received from the memory array 1 as a function of the PS signal received from the memory array 1.

Figure 1C:
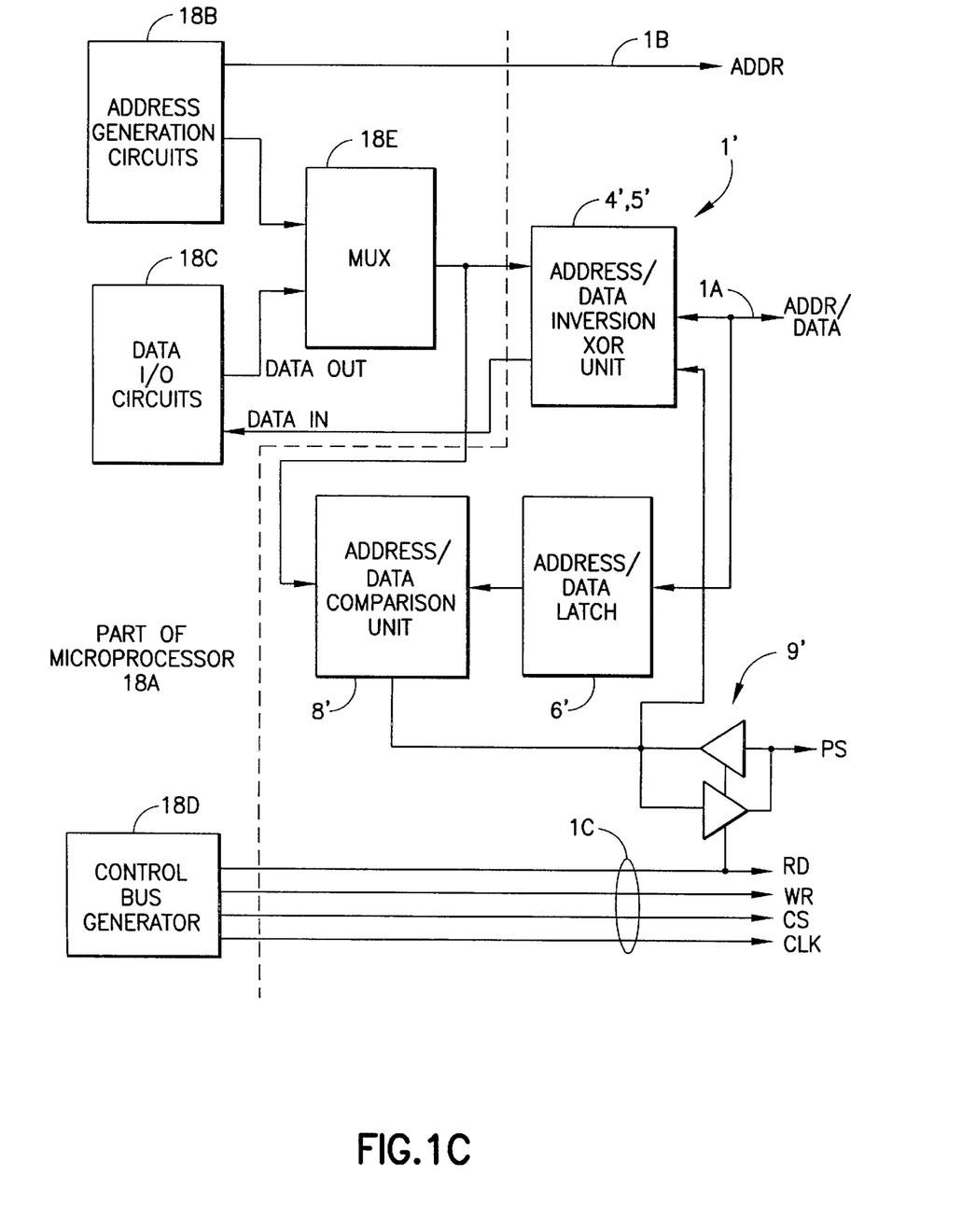
FIG. 1C is a block diagram of microprocessor interface circuitry shown coupled to a microprocessor device which is suitable for coupling to the memory interface circuitry of either FIGS. 1A or 1B.

Referring to FIG. 1C, the microprocessor 18A includes, to the left of the dashed line, conventional address generation circuits 18B, data I/O circuits 18C, a control bus generator 18D, and an address/data multiplexer (MUX) 18E. Various bus buffers and transceivers are not shown for simplicity. The control bus generator 18D is modified to generate the CLK signal during the burst mode read or write accesses. In accordance with this invention the microprocessor 18A also includes the interface 1' comprised of an address/data inversion XOR unit 4' and 5', an address/data latch 6', an address/data comparison unit 8', and a PS transceiver 9'. The interface 1' operates to selectively invert or not invert address and data information before it is driven to the ADDR/DATA bus 1A, and to set the state of the PS signal accordingly. The interface 1' also operates to selectively invert or not invert the data information received from the ADDR/DATA bus 1A, in accordance with the state of the PS signal that is sourced from the MMI 1 of memory array 2 (or some other device that is sourcing data to the microprocessor 18A).

The use of the MMI 1 and the interface 1' reduces the power consumption of the mobile station 10, as described above, and thus prolongs the life of the battery 24 and extends the time between required rechargings of the battery 24.

Although described in the context of a read/write memory array, it should be realized that the MMI 1 can be employed as well with a read only memory (ROM), in a manner described above for the memory read embodiments of FIGS. 2, 3, and 6.

Also, it should be realized that in the preferred embodiment the circuitry shown in FIGS. 1A, 1B and 1C is integrated within a memory chip, memory array, microprocessor, DMA controller, peripheral controller, or some other device, although the circuitry could also be provided as external circuitry. For the case where the memory array is comprised of dynamic memory cells, the required RAS and CAS signals can be generated internally, or externally in a conventional fashion.

Furthermore, the use of this invention does not also require the use of a multiplexed address/data bus. For example, a memory array or peripheral device can be provided with the interface circuitry of this invention for coupling the device to a dedicated data bus. By example, a burst mode memory, or a burst mode peripheral device that inputs high speed data from a communications network or from a disk or CD ROM, can utilize the teaching of this invention to minimize data bus signal line transitions between successive data bytes or words, thereby conserving power.

Thus, while the invention has been particularly shown and described with respect to preferred embodiments thereof, it will be understood by those skilled in the art that changes in form and details may be made therein without departing from the scope and spirit of the invention.

What is claimed is:

1. A method for reducing the power consumption of an electronic system having a first device and a second device that are coupled together through a bidirectional bus, comprising the steps of:

during a first part of a bus cycle, applying an address over the bus from the first device to the second device;

during a second part of the bus cycle, transferring data to or from the first device over at least a portion of the bidirectional bus; and prior to the step of transferring, selectively inverting or not inverting the data, regardless of whether there is to be a chance in direction of data to be transferred over the bidirectional bus, so as to minimize a number of bus signal lines that are required to change state between the first part and the second part of the bus cycle, thereby reducing power consumption by at least reducing an amount of bus capacitance that is required to be charged or discharged in order to transfer the data during the second part of the bus cycle.

2. A method as in claim 1, wherein the step of selectively inverting or not inverting includes the steps of:

generating a control signal to have a first state for indicating whether the transferred data has been inverted or a second state for indicating that the transferred data has not been inverted; and transmitting the control signal to the bus.

3. A method as in claim 2, wherein the step of transferring includes the further steps of:

receiving the transferred data and the control signal from the bus; and inverting the received data or not inverting the received data in accordance with the state of the control signal.

4. A method as in claim 1, wherein the second device is comprised of a memory array, and wherein for a memory read cycle the step of selectively inverting or not inverting is executed by circuitry coupled to the memory array.

5. A method as in claim 1, wherein the second device is comprised of a memory array, and wherein for a memory write cycle the step of selectively inverting or not inverting is executed by the first device.

6. A method as in claim 1, wherein the second device is comprised of a memory array, and wherein for a memory read cycle the method includes the further steps of:

latching the address with circuitry coupled to the memory array;

outputting data from a memory array location specified by the address, the data being output either directly or through memory pipeline latches;

performing a bit by bit comparison of the outputted data with at least a portion of latched address;

determining if more than a predetermined number of bits are not equal; and if more that the predetermined number of bits are not equal, generating a control signal to have a first state, inverting the outputted data prior to driving the outputted data to the bus, and driving the control signal to the bus; else if less that the predetermined number of bits are not equal, generating the control signal to have a second state, driving the outputted data to the bus, and driving the control signal to the bus.

7. A method as in claim 1, wherein the second device is comprised of a memory array, and wherein for a memory read cycle the method includes the further steps of:

latching the address with circuitry coupled to the memory array;

outputting data from a memory array location specified by the address;

performing a bit by bit comparison of the output data with at least a portion of the latched address;

selectively inverting or not inverting the output data based on the result of the comparison;

driving the inverted or not inverted output data to the bus;

latching the inverted or not inverted output data;

incrementing or decrementing the latched address to provide a next latched address;

outputting data from a memory location specified by the next latched address;

performing a bit by bit comparison of the outputted data with the latched data;

selectively inverting or not inverting the outputted data based on the result of the comparison; and driving the inverted or not inverted outputted data to the bus.

8. A method as in claim 1, wherein the step of applying an address includes the steps of:

receiving the address;

receiving a control signal that indicates whether at least a portion of the address was inverted or was not inverted prior to being transferred;

selectively inverting or not inverting the address based on a state of the control signal; and latching the address.

9. A method as in claim 1, wherein the electronic system is a battery powered system.

10. A method as in claim 1, wherein the electronic system is a wireless telephone.

11. A wireless telephone, comprising:

a microprocessor;

a memory;

a bus coupling said microprocessor to said memory, said bus comprising a multiplexed address/data bidirectional bus portion that transfers an address during a first part of a memory access cycle and data during a second part of the memory access cycle; and power saving circuitry coupled to said bus, said power saving circuitry being operative during the second part of a memory access cycle for selectively inverting or not inverting the data, regardless of whether there is to be a change in direction of data to be transferred over the bidirectional bus portion, so as to minimize a number of multiplexed address/data bus signal lines that are required to change state between the first part and the second part of the memory access cycle, thereby reducing power consumption by at least reducing an amount of bus capacitance that is required to be charged or discharged in order to transfer the data during the second part of the memory access cycle.

12. A wireless telephone as in claim 11, wherein said power saving circuitry is comprised of:

a first circuit for generating a control signal to have a first state for indicating whether the transferred data has been inverted or a second state for indicating that the transferred data has not been inverted; and a second circuit for transmitting the control signal to the bus.

13. A wireless telephone as in claim 11, wherein for a memory read cycle the power saving circuitry operates at the memory.

14. A wireless telephone as in claim 11, wherein for a memory write cycle the power saving circuitry operates at the microprocessor.

15. A wireless telephone as in claim 11, wherein the power saving circuitry further includes:

a latch for latching a read address received from the bus and for applying the read address to the memory;

a comparator for performing a bit by bit comparison of data output from the memory with at least a portion of latched address;

means for determining if more than a predetermined number of bits are not equal; and circuit means, responsive to more than the predetermined number of bits not being equal, for generating a control signal to have a first state, for inverting the output data prior to driving the output data to the bus, and for driving the control signal to the bus; said circuit means being responsive to less than the predetermined number of bits not being equal, for generating the control signal to have a second state, for driving the output data to the bus, and for driving the control signal to the bus.

16. A wireless telephone as in claim 11, wherein the power saving circuitry further includes:

a bus capture latch for latching a read address received from the bus and for applying the read address to the memory;

a comparator for performing a bit by bit comparison of data output from the memory with at least a portion of latched address;

means for determining if more than a predetermined number of bits are not equal;

circuit means for selectively inverting or not inverting the output data based on the result of the comparison and for driving the inverted or not inverted output data to the bus;

a latch for latching the inverted or not inverted output data; and means for incrementing or decrementing the latched address to provide a next latched address to read a next memory location;

wherein said means for determining if more than a predetermined number of bits are not equal performs a bit by bit comparison of the outputted data with the latched data; and wherein said means for selectively inverting or not inverting operates based on the result of the comparison.

17. A wireless telephone as in claim 11, and further comprising:

a latch for latching the address; and wherein said power saving circuitry further includes a circuit having a first input coupled to the multiplexed address/data bus, a second input coupled to a control signal received from the bus, and an output coupled to said latch, said circuit selectively inverting or not inverting the address based on a state of said control signal.

18. An electronic device, comprising a plurality of terminals for coupling the electronic device to a bidirectional bus that is external to said electronic device, and also comprising a further terminal for coupling to a bus control signal that indicates, during operation, whether information currently being transferred over said bidirectional bus has been inverted, regardless of whether there was a change in direction of data that was last transferred over the bidirectional bus, in order to minimize a number of bus signal lines that are required to change state between information that was last transferred and the information that is currently being transferred, the inversion of the information being selectively accomplished so as to reduce power consumption by at least reducing an amount of bus capacitance that is required to be charged or discharged in order to transfer the information.

19. An electronic device as in claim 18, wherein said electronic device is comprised of a microprocessor.

20. An electronic device as in claim 18, wherein said electronic device is comprised of a memory array.

21. An electronic device as in claim 18, wherein said electronic device is comprised of a peripheral controller coupled to one of a serial or a parallel bus.

22. An electronic device as in claim 18, wherein said electronic device is comprised of a direct memory access controller.

23. An electronic device as set forth in claim 18, wherein said bus is a multiplexed address/data bus.

24. An electronic device as set forth in claim 18, wherein said bus is a dedicated data bus.

25. A method for reducing the power consumption of an electronic system having a memory array and a device that are coupled together through a bus, comprising the steps of:

during a first part of a bus cycle, applying an address over the bus from the device to the memory array;

in response to the applied address, reading out a plurality of memory array locations in parallel and storing the data output from the memory array locations in a plurality of latches;

during a second part of the bus cycle, transferring data in turn from each of the latches over at least a portion of the bus; and prior to at least some of the steps of transferring, selectively inverting or not inverting the data so as to minimize a number of bus signal lines that are required to change state, thereby reducing power consumption by at least reducing an amount of bus capacitance that is required to be charged or discharged in order to transfer the data during the second part of the memory access cycle, wherein the step of selectively inverting includes a step of comparing data to be output from one of the latches to data stored in another one of the latches, and wherein the step of selectively inverting is performed based on the result of the comparison.

26. A method as in claim 25, wherein the step of selectively inverting or not inverting includes the steps of:

generating a control signal to have a first state for indicating whether the transferred data has been inverted or a second state for indicating that the transferred data has not been inverted; and transmitting the control signal to the bus.

27. A method as in claim 26, wherein the step of transferring includes the further steps of:

receiving the transferred data and the control signal from the bus; and inverting the received data or not inverting the received data in accordance with the state of the control signal.

28. A method as in claim 25, wherein the step of applying the address includes a step of latching the address; and wherein a step of transferring a first data includes the steps of:

performing a bit by bit comparison of the data to be transferred with at least a portion of the latched address; and selectively inverting or not inverting the output data based on the result of the comparison.

29. A method as in claim 25, wherein at least some of the steps of transferring data are executed in response to a transition of a clock signal.

* * * * *